United States Patent [19]

Yamasaki et al.

[11] 4,282,643
[45] Aug. 11, 1981

[54] METHOD OF MAKING METAL GASKETS

[75] Inventors: Koyu Yamasaki, Obu; Yousuke Iino, Nagoya, both of Japan

[73] Assignee: Mitsubishi Jukogyo Kabushiki Kaisha, Japan

[21] Appl. No.: 912,215

[22] Filed: Jun. 5, 1978

[30] Foreign Application Priority Data

Jun. 9, 1977 [JP] Japan .................................. 52-67326

[51] Int. Cl.³ ............................................ B22D 11/126
[52] U.S. Cl. ............................. 29/527.2; 277/235 A; 277/234; 277/236
[58] Field of Search .................... 277/235 A, 234, 235, 277/236; 29/527.2, 527.4

[56] References Cited

U.S. PATENT DOCUMENTS

| 1,825,962 | 10/1931 | Laird | 277/235 A X |
|---|---|---|---|
| 2,905,512 | 9/1959 | Anderson | 277/235 A |
| 3,038,456 | 6/1962 | Dreisin | 277/236 X |
| 3,560,006 | 2/1971 | Watanabe | 277/235 A |
| 3,751,049 | 8/1973 | Busby | 277/235 A |

FOREIGN PATENT DOCUMENTS

| 2117412 | 10/1972 | Fed. Rep. of Germany | 277/235 A |
|---|---|---|---|
| 903618 | 1/1945 | France | 277/235 A |
| 787434 | 12/1957 | United Kingdom | 277/235 A |

Primary Examiner—Francis S. Husar
Assistant Examiner—V. K. Rising
Attorney, Agent, or Firm—McGlew and Tuttle

[57] ABSTRACT

This is a method of making metal gaskets by coating a hollow cylindrical metal blank on each of the entire inner and outer peripheral surfaces with a soft metal to be of a fixed thickness and then cutting it off along an imaginary conical surface having an apex on its center axis.

4 Claims, 11 Drawing Figures

METHOD OF MAKING METAL GASKETS

BACKGROUND OF THE INVENTION

The present invention relates to metal gaskets to be used for sealing means and more particularly to a method of making metal gaskets to be used as sealing means for large diameter vacuum gate valves to be used for nuclear fusion apparatus and the like, gate valves for high temperatures, gate valves for low temperatures, flanges and the like.

A conventional example used for flanges among metal gaskets for sealing means so far applied to the above mentioned uses shall be described. In FIG. 1, the mating faces of upper and lower flanges h and i, fitted respectively to the ends of pipings f and g, are provided with respective grooves m and n for confining a metal gasket a to seal the flange parts. As shown in FIGS. 2 and 3, metal gasket a is shaped in the form of a truncated conical tubular member. Symbols b and c indicate contact surfaces (end surfaces of sealing ends) parallel with the center axis of said metal gasket a, symbol d indicates its inner surface and e indicates its outer surface. This metal gasket a is made by cutting a resilient spring steel to form a truncated conical tubular member as mentioned above, and plating or coating it on the above mentioned respective surfaces b to e.

In this kind of metal gasket, the sharp edge parts (sealing ends) $b_1$ and $c_1$ at the upper and lower ends are the life. In the method wherein, as mentioned above, a spring steel is cut off to form a truncated conical tubular member which is then plated, it is difficult to uniformly plate sharp edge $b_1$ and $c_1$ and to form said parts plating uniformly over the entire periphery. Since the precision of the inside and outside diameters of the metal gasket can not be increased the durability as of these known gaskets has been low.

Further, in order to improve the sealing effect, it is necessary to increase the thickness of the plating layer. However, in the method wherein, as mentioned above, the gasket is cut off to be truncated conical tubular and is then plated, the respective inner and outer surfaces d and e, which actually do not require a plating layer, will be also plated. Thus, the prior technique has not been an economical method.

SUMMARY OF THE INVENTION

An object of the present invention is to provide an economical method of making metal gaskets wherein the above mentioned defects are eliminated and a metal gasket is formed uniformly in the sharp edge parts over the entire periphery to improve the precision of the inside and outside diameters.

Therefore, the present invention comprises making a metal gasket by coating a hollow cylindrical metal blank on each of the entire inner and outer peripheral surfaces with a soft metal to form a fixed thickness and cutting the blank along an imaginary conical surface having an apex on its center axis.

THE DRAWINGS

It is an object of the invention to provide a method of making a conical metal gasket which comprises providing a hollow cylindrical blank formed of a first metallic material, first coating the hollow cylindrical blank on its inner and outer cylindrical surfaces with a uniform thickness of a second metallic material to form a cylindrical inner surface coating layer and a cylindrical outer surface coating layer on the inner and outer cylindrical surfaces, the second metallic material being softer than the first metallic material, and then conically cutting the wall and the inner and outer surface coating layer of the coated cylindrical blank along an angle with respect to the central axis of the cylindrical blank to form a cut surface with sharpened end edges of the coating layers, and the sharpened end edges laying on a uniform conical surface of revolution about the central axis of the cylindrical blank and conically cutting the wall and the inner and outer surface coating layers of the cylindrical blank at a second location to form a second cut surface parallel to the first cut surface.

The object and feature of the present invention will become clearer from the following explanation made with reference to the drawings in which.

DETAILED DESCRIPTION OF THE DRAWINGS

Figure 1:
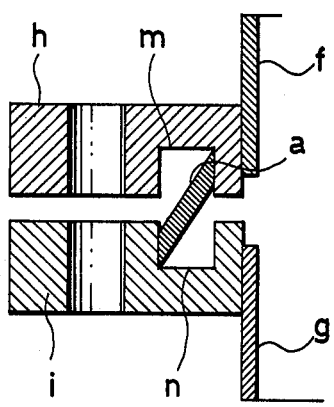
FIG. 1 is a vertically sectioned side view showing a known metal gasket as used for a sealing means.
Figure 3:
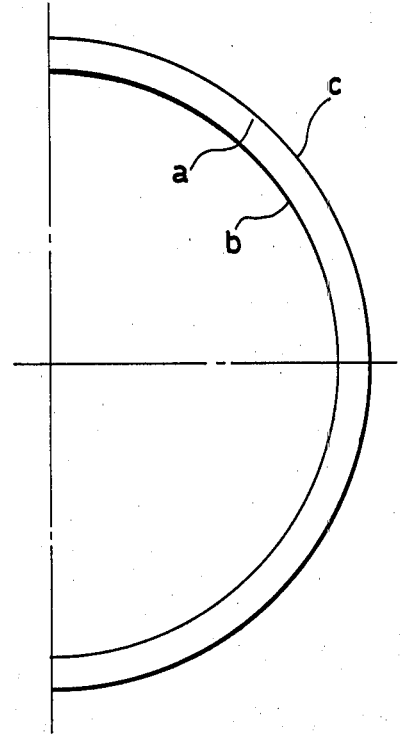
FIG. 3 is plan view the gasket of FIG. 1.
Figure 2:
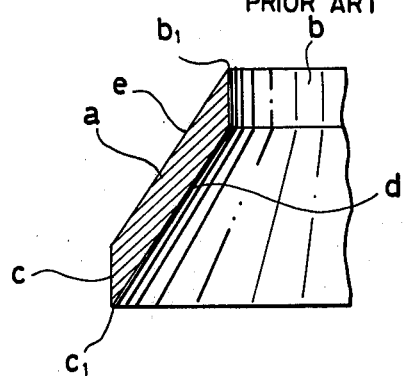
FIG. 2 is a partial side view showing said metal gasket of FIG. 1 vertically sectioned.
Figure 4:
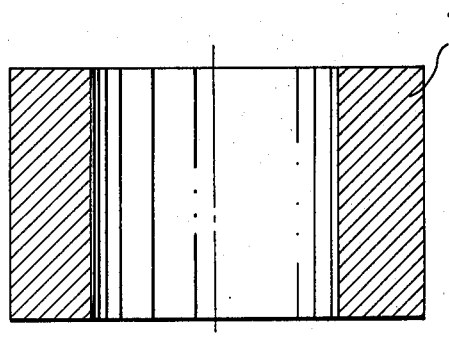
FIGS. 4 to 6b are sectional views illustrating stages of an embodiment of a gasket made by the inventive technique in the order of the method of making metal gaskets according to the present invention.
Figure 5:
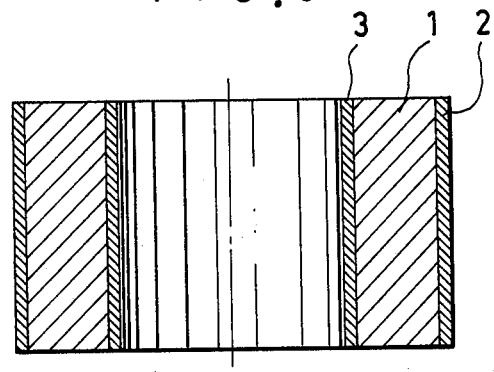
Figure 6A:
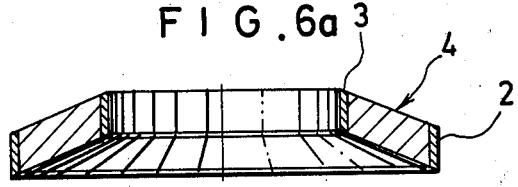
Figure 6B:
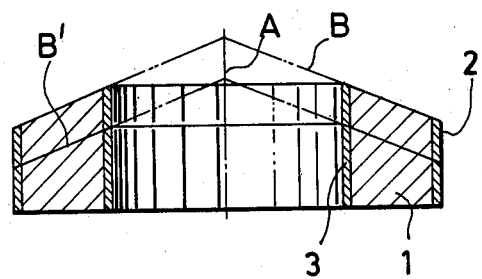
Figure 7:
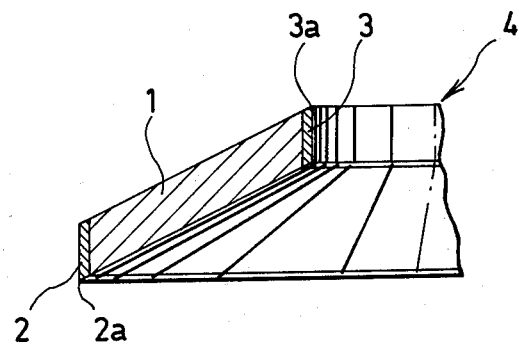
FIG. 7 is a vertically sectioned side view showing as magnified a inventive method, same manufacturing method.

In FIG. 4, reference numeral 1 indicates a hollow cylindrical metal blank made, for example, of a steel or stainless steel. The metal blank is first coated, for example, by plating its entire outer and inner peripheral surfaces respectively with soft metals 2 and 3 as shown in FIG. 5. Then, as shown in FIG. 6b, the metal blank 1 is cut off along an imaginary conical surfaces; B and B' each having an apex on the center line A of the cylinder to make a metal gasket 4 (FIG. 6a). FIG. 7 shows a part of the thus obtained metal gasket 4 as magnified. Reference numerals 2a and 3a designate sharp edge parts.

Figure 8:
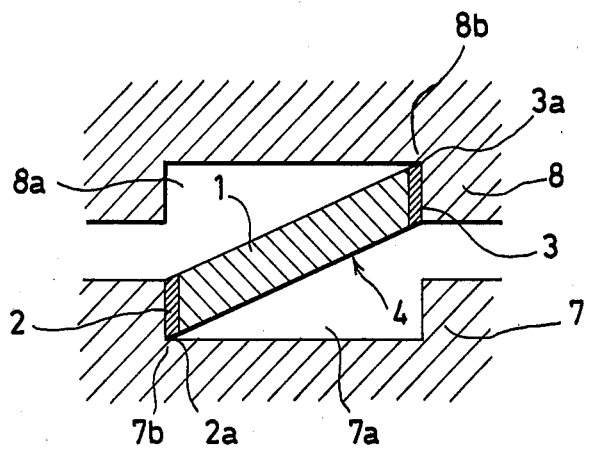
FIGS. 8 and 9 are vertically sectioned side views showing said metal gasket as used.
Figure 9:
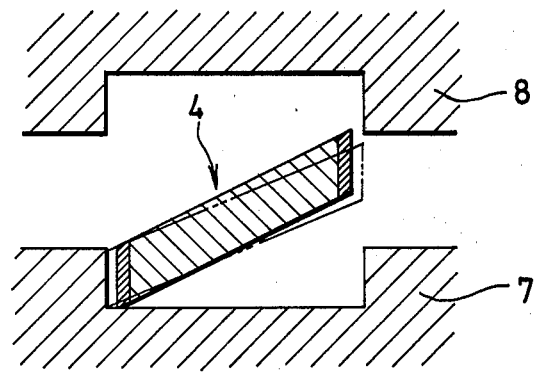

In operation, the metal gasket 4 may be fitted between grooves 7 and 8 as shown in FIG. 8. The soft metals 2 and 3 will contact the wall surfaces of the side parts of the respective grooves 7a and 8a and, at the same time, sharp edge parts 2a and 3a will contact the corner parts 7a and 8a, of the opposed grooves, respectively. When the flanges 7 and 8 are fastened together, the metal gasket 4 will be resiliently deformed in response to the fastening force and, at the same time, the soft metals 2 and 3 will be pressed and collapsed against the corner parts 7b and 8b of the respective grooves 7a and 8a to embed into fine irregularities of the grooves 7 and 8 and to air-tightly seal the flanges 7 and 8. When the flanges 7 and 8 are released from the fastening and are separated from each other as in FIG. 9, the metal gasket 4 will return to the solid line position from the two-point chain line position due to the spring effect. When the flanges 7 and 8 are again fastened together, they will be again in the state of FIG. 8 to seal the flanges 7 and 8.

Figure 10:
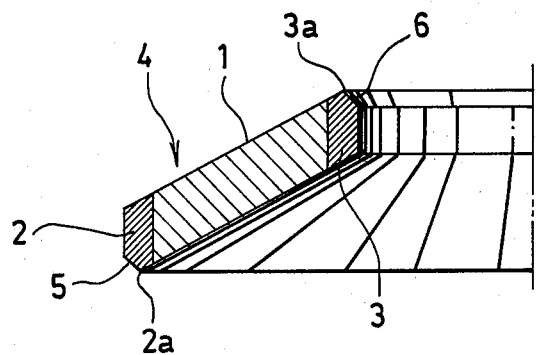
FIG. 10 is a vertically sectioned side view showing another embodiment of a metal gasket obtained by the inventive method according to the present invention.

As shown in FIG. 10, the sharp edge parts 2a and 3a may be formed by chamfering the soft metal 2 at the diamatically opposite lower end as shown by 5 and the soft metal 3 at the upper end as shown by 6 to form parallel chambered surfaces.

In the method of making metal gaskets according to the present invention, as described above, a hollow cylindrical metal blank is coated on each of the entire inner and outer peripheral surfaces with a soft metal to form a uniform thickness and is cut off along an imaginary conical surface having an apex on its center line and therefore sharp edge parts can be uniformly formed respectively at the entire upper end of the inside contact surface and the entire lower end of the outside contact surface. Further, the metal blank is coated with the soft metal and is then cut off as mentioned above. Therefore, the precision of the inside and outside diameters of the metal gasket can be increased. A highly economical benefit is that only the inner and outer contact surfaces need be coated. The metal gaskets of the present invention are very useful in application such as seals for vacuum valves and vacuum gates, seals for vacuum flanges, seals for high temperature service, seals for very low temperature service and the like.

The present invention has been described in the above with reference to the embodiments. However, needless to say, the present invention is not to be limited to only such embodiments but can be modified variously in the design within a range not deviating from the spirit of the present invention.

We claim:

1. A method of making a conical metal gasket which comprises providing a hollow cylindrical blank formed of a first metallic material, first coating said hollow cylindrical blank on its inner and outer cylindrical surfaces with a uniform thickness of a second metallic material to form a cylindrical inner surface coating layer and a cylindrical outer surface coating layer on said inner and outer cylindrical surfaces, said second metallic material being softer than said first metallic material, then conically cutting the wall and said inner and outer surface coating layers of said coated cylindrical blank along an angle with respect to the central axis of the cylindrical blank to form a cut surface with sharpened end edges of said coating layers, said sharpened end edges lying on a uniform conical surface of revolution about the central axis of said cylindrical blank, and then conically cutting the wall and said inner and outer surface coating layers of the cylindrical blank at a second location to form a second cut surface, said second cut surface being parallel to said first cut surface.

2. A method according to claim 1, wherein the coating step further comprises coating the cylindrical blank by plating.

3. A method according to claim 1, comprising subsequently chamfering said second metallic material along at least one of the sharpened end edges.

4. A method according to claim 1, comprising subsequently chamfering said second metallic material along at least two of the sharpened end edges so as to form parallel chamfered surfaces at diametrically opposed locations.

* * * * *